US007293641B2

(12) United States Patent
Toya et al.

(10) Patent No.: US 7,293,641 B2
(45) Date of Patent: Nov. 13, 2007

(54) BELT DRIVING MECHANISM

(75) Inventors: Kiminori Toya, Kawasaki (JP); Hideki Nukada, Yokohama (JP); Yuko Kobayashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 40 days.

(21) Appl. No.: 11/389,188

(22) Filed: Mar. 27, 2006

(65) Prior Publication Data

US 2007/0045939 A1 Mar. 1, 2007

(30) Foreign Application Priority Data

Aug. 24, 2005 (JP) ............................ 2005-243182

(51) Int. Cl.
*B65G 23/44* (2006.01)

(52) U.S. Cl. .............................. 198/832.2; 198/810.03

(58) Field of Classification Search ................ 198/806, 198/810.01, 810.03, 832.2, 833, 835
See application file for complete search history.

(56) References Cited

U.S. PATENT DOCUMENTS 3,949,864 A * 4/1976 Montsant .................... 198/835
4,133,667 A * 1/1979 Nitschke ..................... 198/835
4,715,491 A * 12/1987 Elderton ................ 198/810.01
4,821,873 A * 4/1989 Crane ...................... 198/832.2

FOREIGN PATENT DOCUMENTS

JP 7-157129 6/1995
JP 2004-45700 2/2004
JP 2004-338854 12/2004
JP 2005-96896 4/2005

* cited by examiner

*Primary Examiner*—James R. Bidwell
(74) *Attorney, Agent, or Firm*—Oblon, Spivak, McClelland, Maier & Neustadt, P.C.

(57) ABSTRACT

In a belt driving mechanism, an endless belt is wrapped around a driving roller and a driven roller. The endless belt runs between the driving roller and the driven roller. The axis of the driven roller is placed so as to form a certain angle of torsion to a plane containing opposite ends of the driving roller and a middle point between opposite ends of the driven roller. Rotation of the driven roller is decelerated or stopped with the driving roller keeping on rotating to run the endless belt. Resistance is thus offered to between the endless belt and the driven roller while keeping the driving roller rotating to run the endless belt, so that the endless belt is slipped on the driven roller.

34 Claims, 12 Drawing Sheets

BELT DRIVING MECHANISM

CROSS-REFERENCE TO RELATED APPLICATIONS

This application is based upon and claims the benefit of priority from prior Japanese Patent Application No. 2005-243182, filed Aug. 24, 2005, the entire contents of which are incorporated herein by reference.

BACKGROUND OF THE INVENTION

1. Field of the Invention

The present invention relates to a belt driving mechanism, and in particular, to a belt driving mechanism for a flat belt conveyor system incorporated into an apparatus such as an electro-photographic apparatus, a printer, a printing machine, a bill inspection machine, or a mail sorter.

2. Description of the Related Art

The belt conveyor system is known as a technique for conveying various objects such as sheets, for example, print paper, bills, and tickets using a sheet-like belt having no concavities or convexities. In the field of copiers, a printing method is adopted which transfers a toner image drawn on a transfer belt, from the transfer belt to paper. In this field, the flat belt conveyor system is also used as a mechanism that conveys the transfer belt. The flat belt conveyor system is composed of a plurality of rollers including driving rollers driven by a motor or the like and a flat belt wrapped around the rollers. Rotating at least one of the driving rollers allows the flat belt to be conveyed to drive the entire mechanism.

A problem with the flat belt conveyor system is that the belt may be displaced laterally with respect to a belt driving direction. For example, in the formation of a color image, the lateral displacement can not register various colors when images of the colors are superimposed on one another. It is important for the flat belt conveyor system to accurately control the position of the belt.

A factor causing the lateral displacement of the belt is the tilt of the rollers. When the belt is conveyed with the axes of a driving roller and a driven roller not parallel to each other, the rotating direction of the rollers may be tilted from an intended belt advancing direction. A lateral force thus acts on the belt, which is consequently displaced laterally. Even an inclination equivalent to a design error may laterally shift the belt. A mechanism is thus required which avoids displacing the belt or corrects the belt position.

The following methods have been proposed to prevent the belt from being laterally displaced: providing ribs such that the opposite edges of the belt are caught on the rollers, forming the opposite ends of the rollers into flanges, or shaping the belt like the letter T or the like, that is, so that it has concaves and convexes and driving the belt using rollers having concaves and convexes that are fitted together.

The flat belt can also be run stably by using a crown roller the middle of which is slightly swollen like a drum. To prevent the flat belt from being laterally displaced without using the crown-face roller, a tension roller or the like may be placed and forcibly tilted in response to the lateral displacement of the belt.

Another method for preventing lateral displacement is to fix the running position of the belt using a pole or a guide. This method causes the belt to be always rubbed during driving, thus disadvantageously shortening the life of the belt or apparatus.

Jpn. Pat. Appln. KOKAI Publication No. 7-157129 proposes a method of correcting the belt position using a brake.

This proposal uses the brake to exert a braking force on a part of the belt to vary the tension on the belt surface, thus suppressing the lateral displacement.

The above belt driving mechanism is incorporated into an image forming apparatus disclosed in Jpn. Pat. Appln. KOKAI Publication No. 2004-45700, a bill inspection machine disclosed in Jpn. Pat. Appln. KOKAI Publication No. 2005-96896, a mail sorter disclosed in Jpn. Pat. Appln. KOKAI Publication No. 2004-338854, and the like. The belt driving mechanism is an important component of these apparatuses.

As described above, the belt can be prevented from being laterally displaced by the method of providing ribs such that the opposite edges of the belt are caught on the rollers, forming the opposite ends of the rollers into flanges, or shaping the belt so that it has concaves and convexes, for example, like the letter T and driving the belt using rollers having concaves and convexes that are fitted together. However, these methods forcibly suppress the force displacing the belt laterally to exert an unnatural force on the belt to disadvantageously shorten the life of the belt. Further, if the concaves and convexes of the belt increase its thickness, a stronger force is required to bend the belt. A heavy burden is thus imposed on the conveyor system to also disadvantageously shorten the life of the apparatus. Thus, it is desirable to use a flat belt with a minimum number of concaves and convexes.

With the method of using the crown-face roller, the belt is slightly bent along the middle of the roller during conveyance. Thus, disadvantageously, the crown roller cannot be used in, for example, an apparatus such as a intermediate transfer belt in an image forming apparatus in which bending of the belt may distort the image.

The method of forcibly tilting the tension roller or the like increases the number of parts required and thus the size of the conveyor system. This is disadvantageous in terms of cost and space.

The method proposed by Jpn. Pat. Appln. KOKAI Publication No. 7-157129 uses the brake to exert a braking force on a part of the belt to vary the tension on the belt surface. The lifetime of the belt is shortened because the belt is always rubbed during driving by the method.

The above problematic belt driving mechanism is applied to the image forming apparatus disclosed in Jpn. Pat. Appln. KOKAI Publication No. 2004-45700, the bill inspection machine disclosed in Jpn. Pat. Appln. KOKAI Publication No. 2005-96896, the mail sorter disclosed in Jpn. Pat. Appln. KOKAI Publication No. 2004-338854, and the like. However, the belt driving mechanism has posed various problems in the above apparatuses; processing accuracy may lower as a result of the lateral displacement of the belt and the lifetime of the apparatus may be shortened.

BRIEF SUMMARY OF THE INVENTION

An object of the present invention is to provide a mechanism of correcting a lateral displacement of a belt that may occur in flat belt conveyor system, using a simple method imposing a reduced burden on the mechanism.

According to an aspect of the present invention, there is provided a belt driving mechanism comprising:

a driving roller having first and second opposite ends, a first roller axis passing through the first and second opposite ends and a first middle point between the first and second opposite ends, the driving roller being rotated;

a driven roller having third and fourth opposite ends and a second roller axis passing through the third and fourth opposite ends and a second middle point between the third and fourth opposite ends, the second roller axis being placed at a certain angle of torsion to a plane containing the first and second opposite ends and the second middle point;

an endless belt wrapped around the driving roller and driven roller to run between the driving roller and the driven roller, the driven roller being rotated by the endless belt in accordance with the rotation of the driving roller;

a brake configured to apply a braking force to the driven roller to restrict the rotation of the driven roller while keeping the driving roller rotating to run the endless belt, so that the endless belt is slipped on the driven roller; and a control unit configured to control the brake.

According to another aspect of the present invention, there is provided a method of controlling a position of an endless belt in a belt driving mechanism comprising:

a driving roller having first and second opposite ends, a first roller axis passing through the first and second opposite ends and a first middle point between the first and second opposite ends, the driving roller being rotated;

a driven roller having third and fourth opposite ends and a second roller axis passing through the third and fourth opposite ends and a second middle point between the third and fourth opposite ends, the second roller axis being placed at a certain angle of torsion to a plane containing the first and second opposite ends and the second middle point; and an endless belt wrapped around the driving roller and driven roller to run between the driving roller and the driven roller, the driven roller being rotated by the endless belt in accordance with the rotation of the driving roller;

the method comprising:

applying a braking force to the driven roller and adjusting the braking force to restrict the rotation of the driven roller while keeping the driving roller rotating to run the endless belt, so that the endless belt is slipped on the driven roller.

DETAILED DESCRIPTION OF THE INVENTION

There will be described a belt driving mechanism in accordance with an embodiment of the present invention with referring to the accompany drawings.

As an example of an apparatus which is provided with the belt driving mechanism in accordance with the embodiment of the present invention, description will be given of an image forming apparatus such as the one shown in Jpn. Pat. Appln. KOKAI Publication No. 2004-45700. Description will also be given of the formation of a toner image, which is a job performed by the image forming apparatus.

Figure 1:
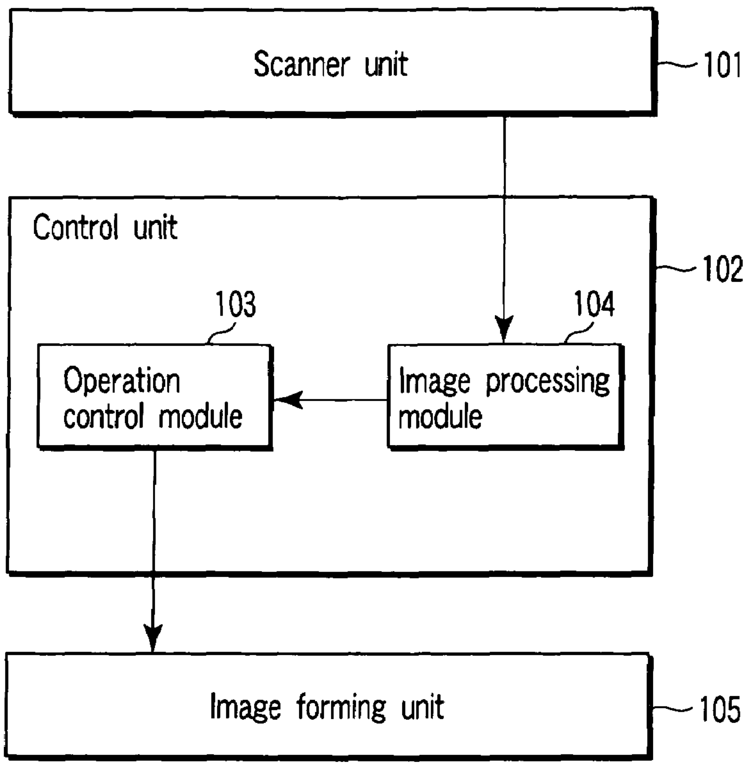
FIG. 1 is a block diagram schematically showing an image forming apparatus into which a belt driving mechanism in accordance with an embodiment of the present invention is incorporated.

FIG. 1 is a block diagram schematically showing an image forming apparatus into which the belt driving mechanism in accordance with the embodiment of the present invention is incorporated.

In the image forming apparatus shown in FIG. 1, a scanner unit 101 reads a document image to generate image data on the basis of information on the colors of the document image including red, green, blue, and black. The image data is then sent to a control unit 102 comprising an operation control unit 103 that controls operations of the image forming apparatus and an image processing module 104 that processes image data. The image processing module 104 converts the image data generated by the scanner unit 101 into image data on four colors including yellow, magenta, cyan, and black. On the basis of the resulting image data on the four colors, the operation control unit 103 controls the image forming unit 105 to form a toner image on a photosensitive drum 1*a* serving as a first image carrier. The toner image formed is then transferred to paper P serving as a second image carrier.

Figure 2:
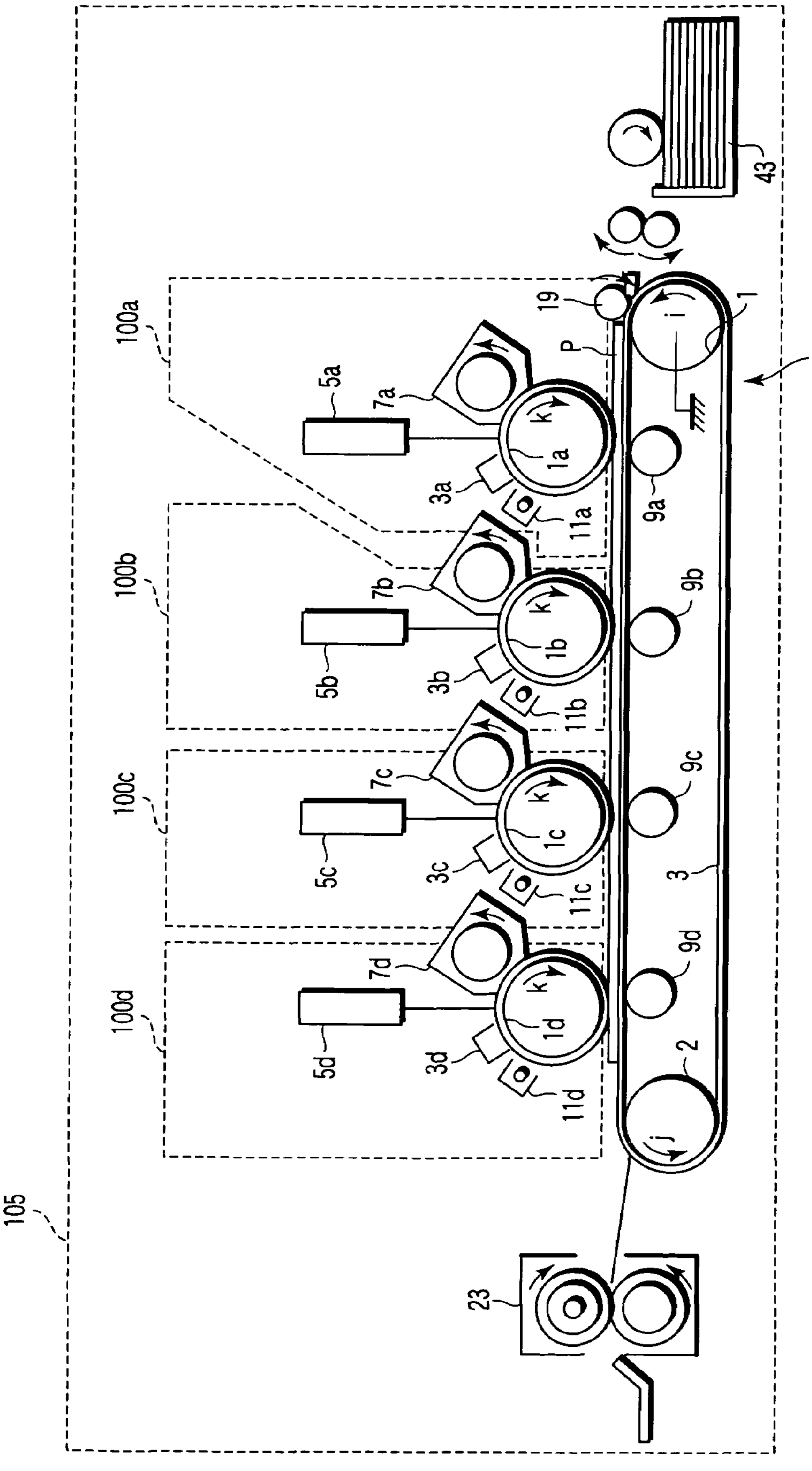
FIG. 2 is a block diagram schematically showing the details of the mechanism of an image forming unit shown in FIG. 1.

FIG. 2 shows the image forming unit 105 in detail. The photosensitive drum 1*a* is rotated in the direction of an arrow in FIG. 2, which is a component of the image forming unit 105 and serves as the first image carrier. A charging device 3*a* is disposed opposite a surface of the photosensitive drum 1*a* to negatively charge the surface. An exposure device 5*a* is disposed at a position where, as a result of rotation of the photosensitive drum 1*a,* it lies opposite an area of the photosensitive drum 1*a* charged by the charging device 3*a* and exposes the photosensitive drum 1*a* to form an electrostatic latent image.

A developing device 7*a* is disposed at a position where, as a result of rotation of the photosensitive drum 1*a,* it lies opposite the area of the photosensitive drum 1*a* on which the electrostatic latent image has been formed by the exposure device 5*a* and then uses a certain housed developer to develop the electrostatic latent image into a toner image. A belt 13 is disposed at a position where, as a result of rotation of the photosensitive drum 1*a,* it contacts the area of the photosensitive drum 1*a* in which the electrostatic latent image has been developed into the toner image by the developing device 7*a*; paper P is conveyed on the belt 13. The conveyor belt 3 is rotated by a driven roller 2 and a driving roller 1 to convey the paper P from upstream to downstream. Here, the upstream and downstream sides are defined on the basis of the direction in which the conveyor belt 3 conveys the paper P.

The conveyor belt 3 attracts the paper P charged by an attracting device 19 with an electrostatic force. The driving roller 1 and driven roller 2, which are in contact with the conveyor belt 3, are electrically grounded to maintain a stable electrostatic force between the conveyor belt 3 and the paper P. Rotating the driving roller 1 in the direction of arrow i concurrently rotates the driven roller 2 in the direction of arrow j. The conveyor belt 3 is rotated at a velocity equal to the peripheral velocity of the photosensitive drum 1.

A transfer device 9*a* is disposed opposite a surface of the conveyor belt 3 which is located opposite the surface lying opposite the photosensitive drum 1*a* and paper P; the transfer device 9*a* transfers the toner image from the photosensitive drum 1*a* to the paper P. A positive voltage is applied to the transfer device 9*a* to attract and transfer the toner image formed on the photosensitive drum 1*a* to the paper P by an electrostatic force.

A static eliminating device 11*a* is disposed at a position where, as a result of rotation of the photosensitive drum 1*a,* it lies opposite the area of the photosensitive drum 1*a* on which the toner image transferred to the paper P was formed, to uniformly eliminate static electricity from the surface of the photosensitive drum 1*a.* The static eliminating device 11*a* is composed of a light emitting element consisting of a LED or the like and uniformly irradiating the photosensitive drum 1*a* with light beams. A first process unit 100*a* is composed of the photosensitive drum 1*a,* the charging device 3*a*, the exposure device 5*a*, the developing device 7*a*, the transfer device 9*a*, and the static eliminating device 11*a.*

A second process unit 100*b* is configured similarly to the first process unit. The second process unit 100*b* is disposed at a position where it further transfers a toner image to the paper P to which the above toner image has already been transferred by the first process unit 100*a* and which is conveyed on the conveyor belt 3. A third process unit 100*c* is disposed at a position where it further transfers a toner image to the paper P to which the above toner image has already been transferred by the second process unit 100*b* and which is conveyed on the conveyor belt 3. A fourth process unit 100*d* is disposed at a position where it further transfers a toner image to the paper P to which the above toner image has already been transferred by the third process unit 100*c* and which is conveyed on the conveyor belt 3. Reference numeral 3 denotes a paper stocker that supplies paper to the conveyor belt 3.

The second, third, and fourth process units 100*b,* 100*c*, and 100*d* are configured similarly to the first process unit 100*a.* Accordingly, the parts or components constituting the process units 100*b*, 100*c*, and 100*d* are denoted by the same reference numerals as those for the first process unit 100*a,* that is, 1, 3, 5, 7, 9, 11, etc. Additional symbols "b", "c", and "d" corresponding to the process units are added to these reference numerals. These parts or components will thus not be described.

The developing device 7*a* in the first process unit 100*a* accommodates a yellow developer. A developing device 7*b* in the second process unit 100*b* accommodates a magenta developer. A developing device 7*c* in the third process unit 100*c* accommodates a cyan developer. A developing device 7*d* in the fourth process unit 100*d* accommodates a black developer.

Figure 3:
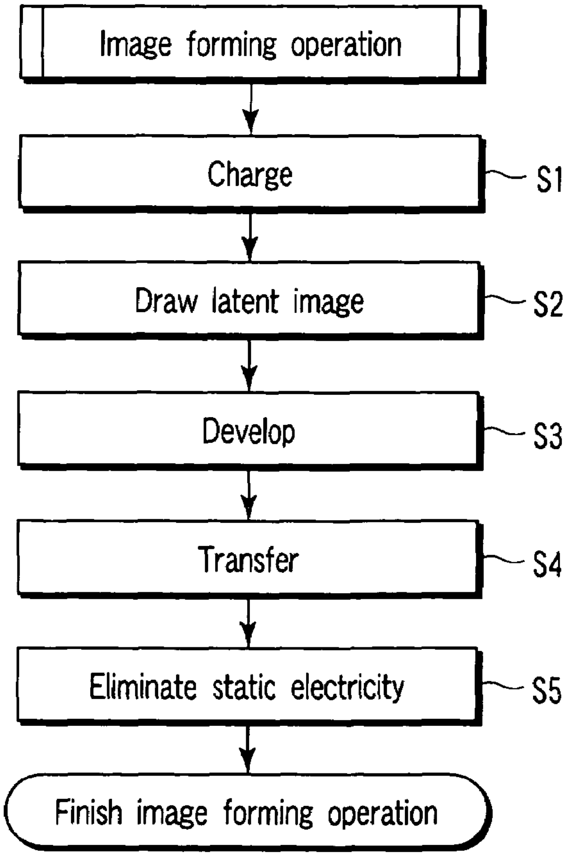
FIG. 3 is a flowchart showing an image forming operation of the image forming apparatus shown in FIG. 2.

A fixing device 23 is provided at a position to which the paper P on which the toner image has been formed by the four process units 100*a,* 100*b,* 100*c*, and 100*d* is conveyed on the conveyor belt 3; the fixing device 23 fixes the toner image to the paper P. Now, operations of the image forming apparatus 1 will be described with reference to FIG. 3 showing a flowchart for an image forming operation of the image forming apparatus 1.

In the first process unit 100*a*, the photosensitive drum 1*a* starts rotating in the direction of arrow k. The charging device 3*a* then uniformly charges the surface of the photosensitive drum 1*a* (S1). The photosensitive drum 1*a* rotates, and the charged area of its surface lies opposite the exposure device 5*a*. The exposure device 5*a* then exposes the surface of the photosensitive drum 1*a* to form an electrostatic latent image on the basis of yellow image data generated by the image processing device 104 (S2). The photosensitive drum 1*a* rotates, and the area of its surface on which the electrostatic latent image has been drawn lies opposite the developing device 7*a*. The developing device 7*a* then uses yellow toner sufficiently negatively charged in itself to develop the electrostatic lateral image drawn on the surface of the photosensitive drum 1*a* into a toner image (S3). The transfer device 9*a* is subsequently operated at a predetermined time to transfer the toner image formed on the surface of the photosensitive drum 1*a* to the paper P passing between the transfer device 9*a* and the photosensitive drum 1*a* (S4). The static eliminating device 11*a* eliminates static electricity from the surface of the photosensitive drum 1*a* on which toner remains rather than being transferred to the paper P (S5).

In the above image forming apparatus, the paper P is conveyed by conveyor system 10 including the conveyor belt 3, driven roller 2, and driving roller 1. The toner image is transferred to the paper P during the conveyance. The role of the belt driving mechanism constituting the conveyor system 10 is important for such a conveying and transferring job. With reference to FIGS. 4 to 21, description will be given below of the belt driving mechanism in accordance with the embodiment of the present invention, which performs such a conveying and transferring job.

It should be noted that, in the description below, the job is not limited to a conveying and transferring job utilizing the belt driving mechanism in the above image forming apparatus but also means a job of conveying media utilizing a belt driving mechanism in another apparatus, for example, the bill inspection machine disclosed in Jpn. Pat. Appln. KOKAI Publication No. 2005-96896 or the mail sorter disclosed in Jpn. Pat. Appln. KOKAI Publication No. 2004-338854.

Figure 4:
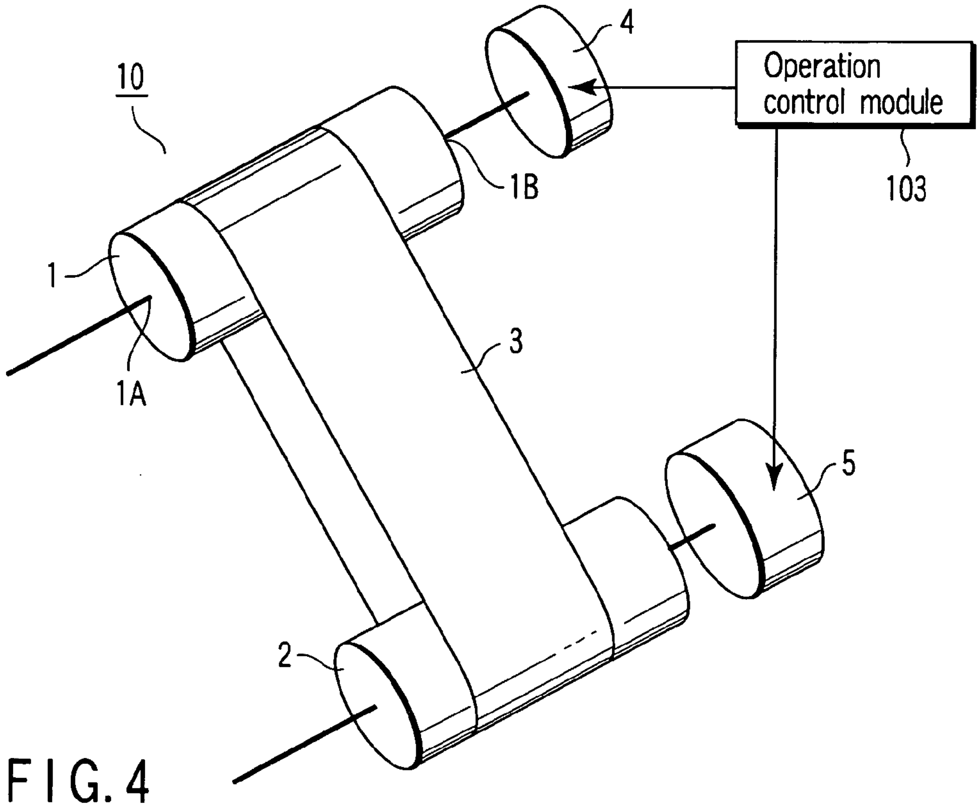
FIG. 4 is a perspective view schematically showing conveyor system that utilizes a belt driving mechanism in accordance with a first embodiment of the present invention.
Figure 5A:
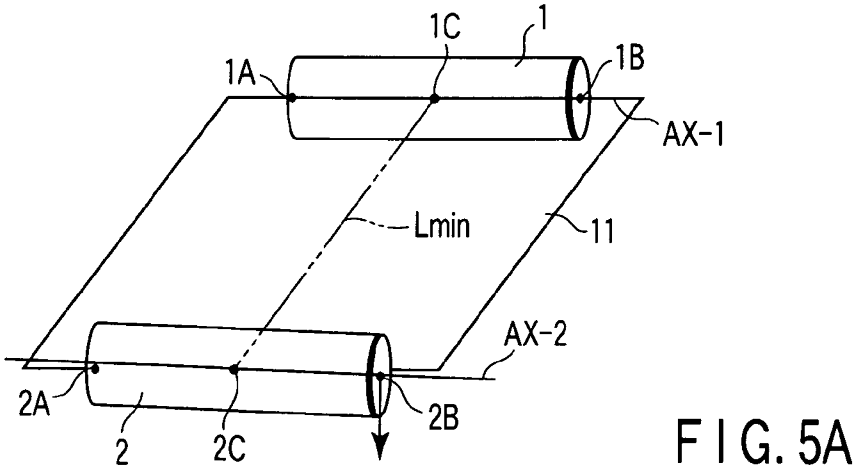
FIGS. 5A and 5B are schematic diagrams showing the positional relationship between a driving roller and a driven roller shown in FIG. 4.
Figure 5B:
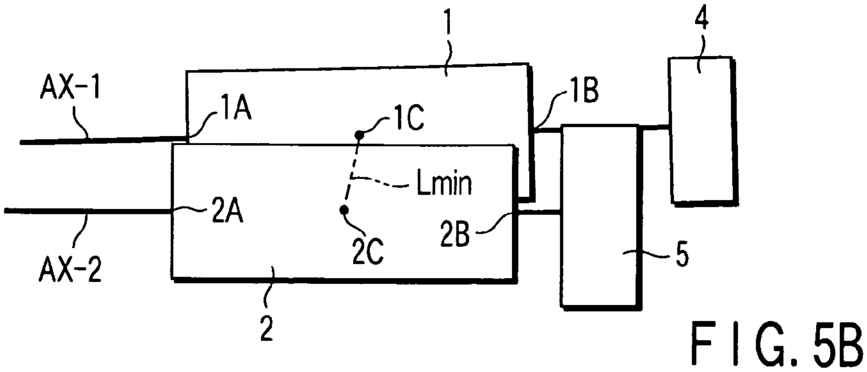

FIGS. 4, 5A, and 5B show the conveyor system 10 that utilizes a belt driving mechanism in accordance with a first embodiment of the present invention.

The conveyor system 10 is composed of the driving roller 1, which is rotated by exerting a driving force on it, the driven roller 2, to which a rotating force from the driving roller 1 is transmitted, and the endless belt 3, passed between the driving roller 1 and the driven roller 2 and run on the driving roller 1 and driven roller 2 by the driving roller 1 to rotate the driven roller 2. The driving roller 1 is connected to a motor 4 directly or via a connecting mechanism such as a timing belt and is driven by the motor 4. The driven roller 2 is connected to a brake 5 that applies a braking force to the driven roller 2. The motor 4 and the brake 5 are controlled by the operation control unit 103.

The driving roller 1 is driven by rotation of the motor. The driving roller 1 is rotated to convey the endless belt 3, and the endless belt 3 is passed between the driving roller 1 and the driven roller 2, around the driving roller 1 and the driven roller 2. The conveyance of the endless belt 3 causes the driven roller 2 to be concurrently rotated. Thus, the motor 4 drives the conveyor system 10, and the operation control unit 103 controllably rotates the motor 4 and controls the brake 5 using required timings as described later.

The belt driving mechanism shown in FIG. 4 comprises the brake 5, which exerts a braking force on the driven roller 2, and the operation control unit 103, which controls the brake 5. This enables only the driven roller 2 to be decelerated or stopped at a particular time. With only the driven roller 2 decelerated or stopped, the endless belt 3 is driven while slipping on the driven roller 2. Here, the particular time may be specified so that the driven roller 2 is decelerated or stopped when the period during which the driving roller 1 is rotated or the endless belt 3 is run exceeds a predetermined threshold. This is because the period during which the driving roller 1 is rotated or the endless belt 3 is run is substantially proportion to the amount of lateral displacement of the endless belt 3.

When the endless belt 3 thus slips on the driven roller 2, the endless belt 3 is placed so as to minimize the length of the path circulating between the driving roller 1 and the driven roller 2; the endless belt 3 thus runs stably. Thus, as shown in FIGS. 5A and 5B, the axis AX-1 of the driving roller 1 and the axis AX-2 of the driven roller 2 are arranged in a relatively torsional relationship with respect to a reference plane 11 so as to minimize the length of the circulating path at the center of the driving roller 1 and the driven roller 2. The reference plane 11 is defined by three points as shown in FIG. 5A. Either a first or second reference plane is utilized. The first reference plane as the reference plane 11 is defined by opposite ends 1A and 1B of the driving roller 1 through which the axis AX-1 of the driving roller 1 passes, as well as the middle point, that is, center point 2C, between opposite ends 2A and 2B of the driven roller 2 through which the axis AX-2 of the driven roller 2 passes, as shown in FIG. 5A. The second reference plane as the reference plane 11 is defined by the middle point, that is, center point 1C, between the opposite ends 1A and 1B of the driving roller 1 through which the axis AX-1 of the driving roller 1 passes, as well as the opposite ends 2A and 2B of the driven roller 2 through which the axis AX-2 of the driven roller 2 passes. FIG. 5A shows only the first reference plane as the reference plane 11. This figure shows an example in which the axis AX-2 of the driven roller 2 is inclined outward from the reference plane 11.

The first reference plane as the reference plane 11 contains the axis AX-1 of the driving roller 1 but not the axis AX-2 of the driven roller 2 as shown in FIG. 5A. Consequently, the axis AX-1 of the driving roller 1 and the axis AX-2 of the driven roller 2 are not arranged parallel to each other but in the relatively torsional relationship with respect to the reference plane 11 as shown in FIG. 5B. If the second reference plane is used as the reference plane 11, the second reference plane contains the axis AX-2 of the driven roller 2 but not the axis AX-1 of the driving roller 1. Thus, likewise, the axis AX-1 of the driving roller 1 and the axis AX-2 of the driven roller 2 are not arranged parallel to each other but in the relatively torsional relationship with respect to the reference plane 11.

The angle of torsion between the axis AX-1 of the driving roller 1 and the axis AX-2 of the driven roller 2, which are in the torsional relationship, is set at 5° or smaller, preferably between 0.01° and 1°. The angle of torsion corresponds to the angle between the axis AX-2 of the driven roller 2 and the first reference plane as the reference plane 11. The torsional relationship can be established by inclining the axis AX-2 of the driven roller 2 from the first reference plane as the reference plane 11. The angle of torsion similarly corresponds to the angle between the axis AX-1 of the driving roller 1 and the second reference plane as the reference plane 11. The torsional relationship can be established by inclining the axis AX-1 of the driving roller 1 from the second reference plane as the reference plane 11. In the design of the belt driving mechanism consisting of the driving roller 1, the driven roller 2, and the endless belt 3, the driving roller 1 and the driven roller 2 are appropriately arranged so as to set such an angle of torsion. The driven roller is preferably provided with a structure that adjusts the inclination or installed position of the driven roller so as to fine the position of the rollers after the belt mechanism has been assembled.

If the axis AX-1 of the driving roller 1 and the axis AX-2 of the driven roller 2 are in the torsional relationship, the minimum distance between the axes AX-1 and AX-2 is determined. However, normally, the minimum distance Lmin between the axes AX-1 and AX-2 is preferably set between the center point 1C of the driving roller 1 on the axis AX-1 and the center point 2C of the driven roller 2 on the axis AX-2.

The frictional force between the endless belt 3 and the driving roller 1 or driven roller 2 is set by appropriately selecting a material for the roller surface and adjusting the contact angles between the rollers and belt. The preferable roller surface material for the driving roller 1 is such that the coefficient of friction μ1 of the driving roller 1 is larger than that μ2 of the driven roller 2. The preferable roller surface material for the driven roller 2 is such that the coefficient of friction μ2 of the driven roller 2 is smaller than that μ1 of the driving roller 1. For example, the surface of the driving roller 1 is composed of urethane rubber, which provides a relatively large coefficient of friction μ1. The surface of the driven roller is composed of acetal resin, which provides a relatively small coefficient of friction μ2.

The contact angles $\alpha$, $\theta 1$, and $\theta 2$ between the rollers and the belt are preferably adjusted on the basis of the diameters and arrangement of the rollers. In the conveyor system shown in FIG. 6, by way of example, the driving roller 1 and driven rollers 2-1 and 2-2 are arranged and their diameters are set so as to provide the contact angles $\alpha$, $\theta 1$, and $\theta 2$ between the rollers and the belt. In the conveyor system shown in FIG. 6, the two driven rollers 2-1 and 2-2 are provided for the one driving roller 1 and lie opposite each other. The endless belt 3 is wrapped around the driving roller 1 and driven rollers 2-1 and 2-2. The driving roller 1 and driven rollers 2-1 and 2-2 are arranged so that the endless belt 3 is fed from the driving roller 1 toward the driven roller 2-1 and then toward the driven roller 2-2 and then back to the driving roller 1. In the conveyor system shown in FIG. 6, each of the driven rollers 2-1 and 2-2 is in the relatively torsional relationship with the driving roller 1 as already described.

Figure 6:
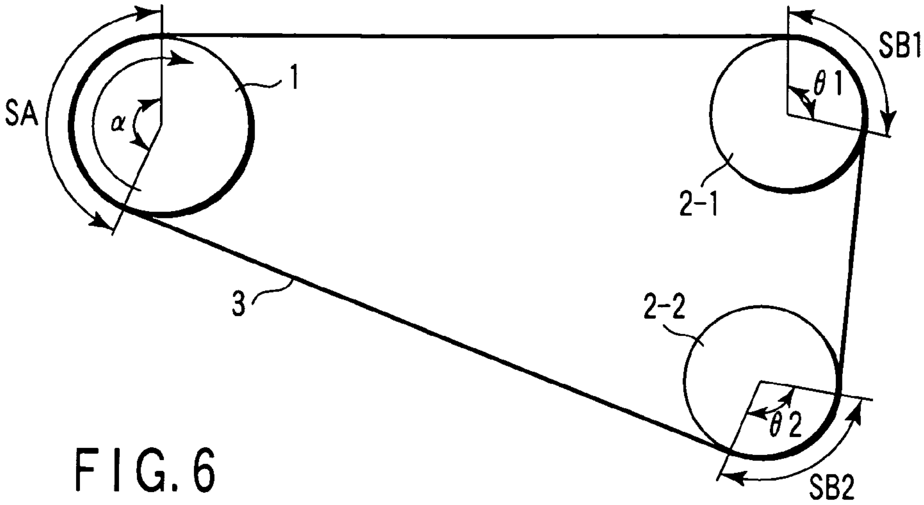
FIG. 6 is a schematic diagram showing an example of arrangement of a driving roller and driven rollers in the belt driving mechanism in accordance with the first embodiment of the present invention, the arrangement provides contact angles $\alpha$, $\theta$1, and $\theta$2.
Figure 7:
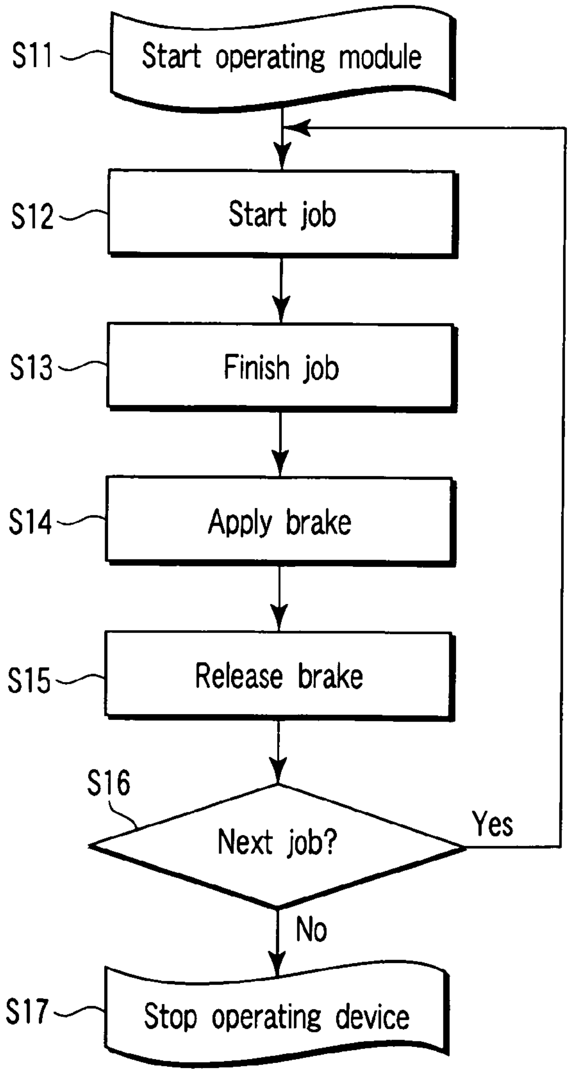
FIG. 7 is a flowchart showing a control method of correcting a belt position in conveyor system provided with the belt driving mechanism shown in FIG. 4 or 6.

Specifically, the contact angles $\alpha$, $\theta 1$, and $\theta 2$ shown in FIG. 6 are set as described below. A large contact angle $\alpha$ is preferably set between the driving roller 1 and the belt 3 so as to obtain a required driving force. Small contact angles $\theta 1$ and $\theta 2$ are preferably set between the driven roller 2 and the belt 3 so that the frictional resistance offered by the decelerated driven roller 2 is smaller than the driving force. The adjustment of the contact angles $\alpha$, $\theta 1$, and $\theta 2$ enables the area SA of contact of the belt 3 with the driving roller 1 to be made larger than the area SB1 or SB2 of contact of the belt 3 with the driven roller 2. This enables the endless belt 3 to be driven to slip on the decelerated or stopped driven roller 2.

The brake 5 may be any of a drum brake, an electromagnetic brake, and a disk brake provided that it can exert a sufficient braking force on a particular driven roller.

With reference to a flowchart 1, description will be given of a control method of correcting the belt position in the conveyor system comprising the belt driving mechanism shown in FIG. 4 or 6. The operation of a transfer device is started by the operation control unit 103 as shown in step S11. The driving roller 1 is then rotated to drive the endless belt 3. As shown in step S12, the operation control unit 103 starts a job concurrently with the running of the endless belt 3. As shown in step S13, the operation control unit 103 subsequently finishes the job. As shown in step S14, the operation control unit 103 actuates the brake 5 for a predetermined actuation time. A braking force is thus applied to the driven roller 2 for a specified period to correct the belt position. On this occasion, the operation control unit 103 need not change the rotation speed of the motor 4. When the frictional force between the driving roller 1 and the endless belt 3 is larger than that between the driven roller 2 and the endless belt 3, the endless belt 3 slips on the driven roller 2 as the motor 4 rotates continuously. This moves the endless belt 3 to a position where the circulating path between the driving roller 1 and the driven roller 2 is minimized. As shown in step S15, the operation control unit 103 subsequently stops applying a braking force to the driven roller. As shown in step S16, the operation control unit 103 determines whether or not there is a next job. If there is a next job, the process returns to step S12. If there is no further job, the operation control unit 103 stops operating the driving roller and thus the apparatus as shown in step S17.

The operation period of the brake may be set at a predetermined value by, for example, pre-measuring the time required to correct the belt position. The driven roller 2, braked by the brake 5, may have its rotation completely stopped or may continue to rotate while being braked by a braking force, that is, may continue limited rotation.

Now, with reference to FIG. 8, description will be given of a belt driving mechanism in accordance with a second embodiment of the present invention.

Figure 8:
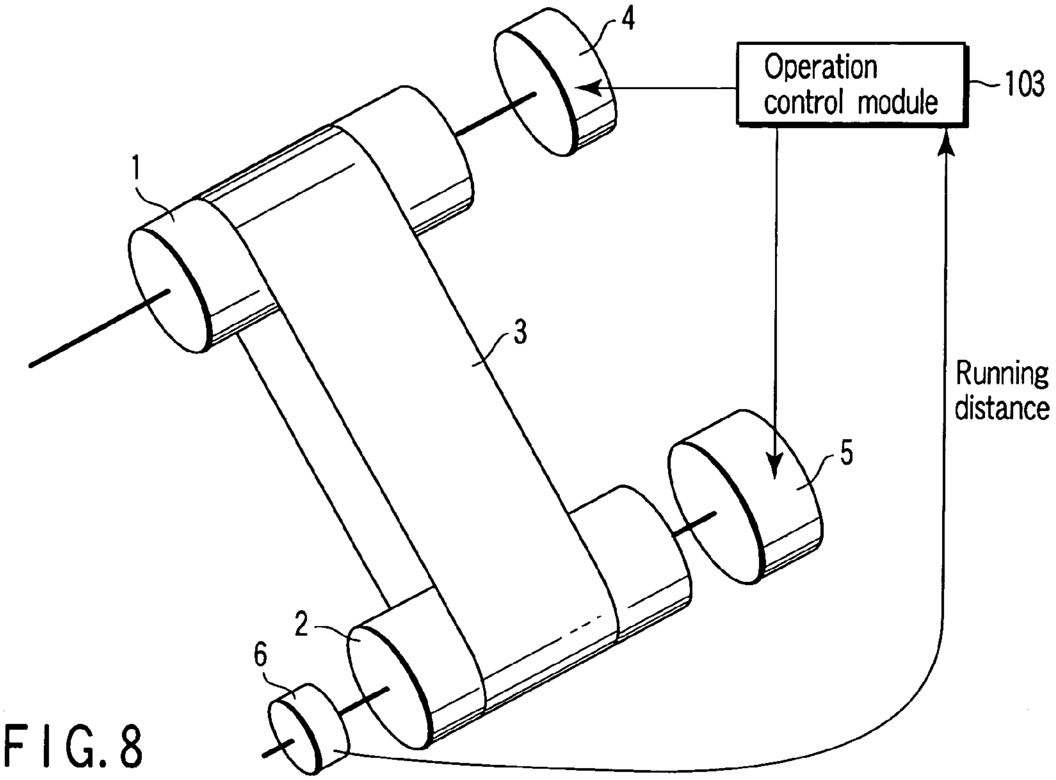
FIG. 8 is a perspective view schematically showing a belt driving mechanism in accordance with a second embodiment of the present invention.

In the belt driving mechanism shown in FIG. 8, an encoder 6 is connected to the driven roller 2 shown in FIG. 1, to detect rotation of the driven roller 2. The encoder 6 measures the running distance of the belt, which has a positive correlation with the amount of lateral displacement of the belt. The amount of lateral displacement of the belt has a tolerable margin specific to the apparatus. A threshold for the running distance is thus set so as to prevent the amount of lateral displacement of the belt from exceeding the margin. An output from the encoder 6 is input to the operation control unit 103. When the running distance of the belt exceeds the threshold, the operation control unit 103 performs control such that the brake 5 is actuated to exert a braking force on the driven roller 2. The encoder need not necessarily be connected to a driven roller shaft 5 but may be connected to a driving roller shaft. The encoder may be built into the motor 4.

Figure 9:
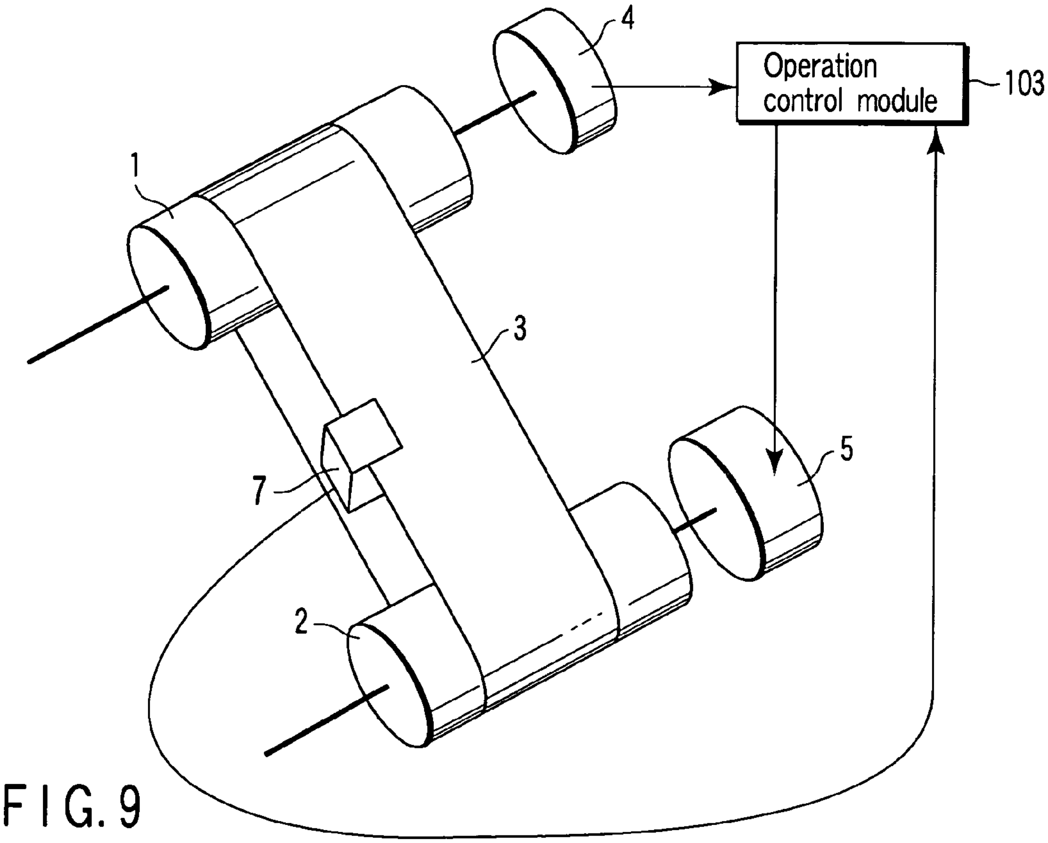
FIG. 9 is a perspective view schematically showing a belt driving mechanism in accordance with a third embodiment of the present invention.

FIG. 9 shows a belt driving mechanism in accordance with a third embodiment of the present invention. In the belt driving mechanism shown in FIG. 9, a sensor 7 is provided in place of the encoder 6 shown in FIG. 8, to measure the running distance of the belt 3. An example of the running distance measuring sensor 7 is a magnetic sensor that measures magnetic marks embedded in the belt. The belt driving mechanism shown in FIG. 9 enables the belt position to be controlled similarly to the belt driving mechanism shown in FIG. 8.

Figure 10:
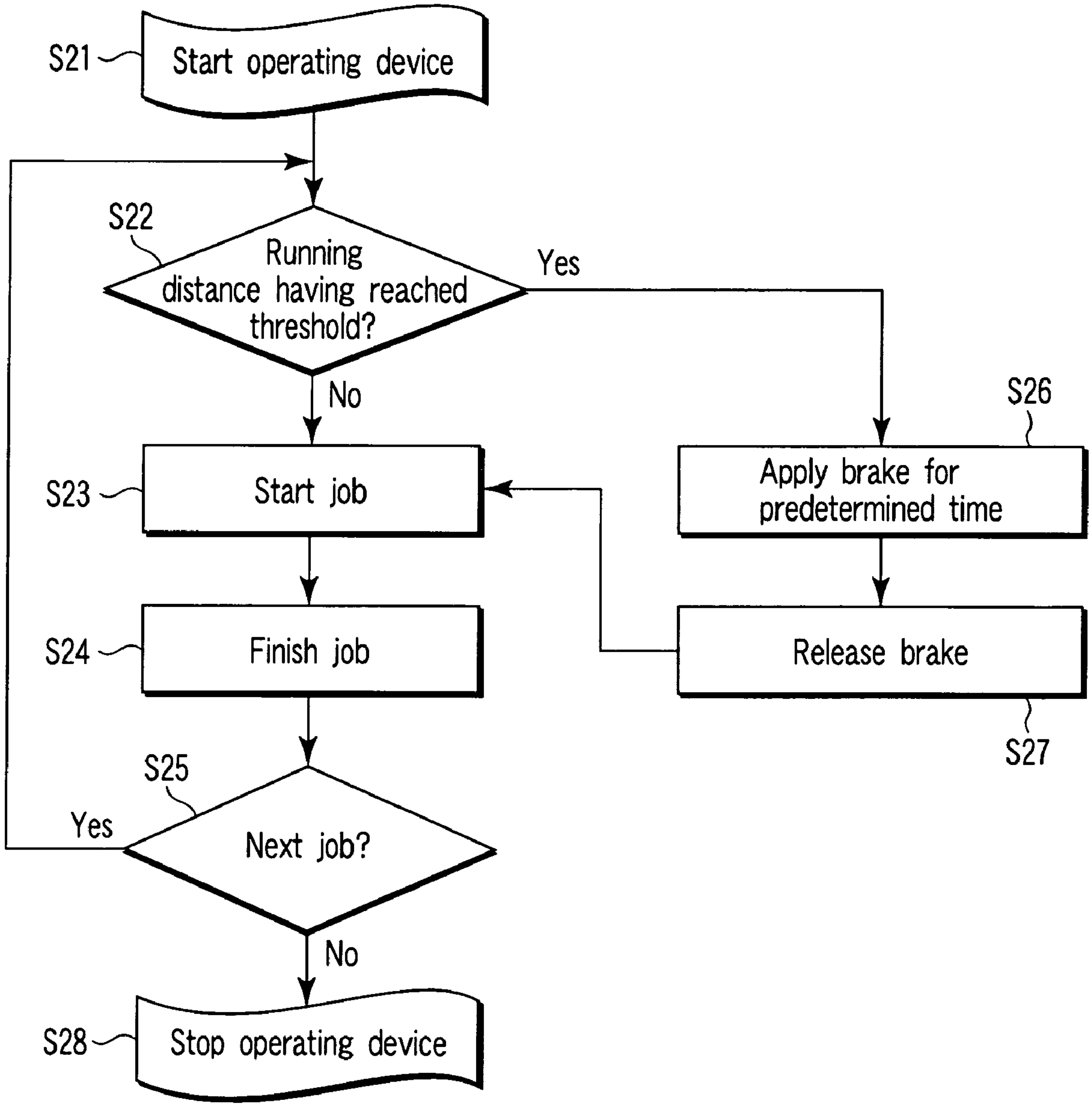
FIG. 10 is a flowchart showing a control method of correcting the belt position in the belt driving mechanisms shown in FIGS. 8 and 9.

With reference to the flowchart shown in FIG. 10, description will be given of a control method of correcting the belt position in the belt driving mechanisms shown in FIGS. 8 and 9. As shown in step S21 in FIG. 10, the operation control unit 103 starts operating the apparatus to rotate the driving roller to drive the conveyor system. As shown in step S22, the operation control unit 103 references the running distance of the belt 3 on the basis of the output from the encoder 6 or sensor 7. If the running distance of the belt 3 is at least the threshold, the operation control unit 103 activates the brake 5 for a predetermined activation time to exert a braking force on the driven roller 2 for a specified period to correct the belt position, instead of immediately starting the job as shown in step S26. This moves the endless belt 3 to a position where the circulating path between the driving roller 1 and the driven roller 2 is minimized. As shown in step S27, the operation control unit 103 subsequently stops applying a braking force to the driven roller. As shown in step S23, the operation control unit 103 starts the job. If the running distance of the belt 103 is less than the threshold in step S22, then as shown in step S23, the operation control unit 103 starts the job. Once the job is finished as shown in step S24, the operation control unit 103 determines whether or not there is a next job as shown in step S25. If there is a next job, the process returns to step S22. If there is no further job, the operation control unit 103 stops operating the driving roller and thus the apparatus as shown in step S28.

In the above process, before the start of the job, the operation control unit 103 determines the presence of a brake operation depending on the running distance. The operation control unit 103 can thus ensure that, during the execution of the job, the belt 3 is run within a predetermined tolerable margin in spite of a displacement of the belt. Here, the running distance means the distance the belt 3 runs continuously without being subjected to a braking force.

The following method enables the more accurate sensing and control of the position to which the endless belt 3 is displaced laterally with respect to the running direction: the lateral position of the belt is sensed by, for example, detecting the edge of the belt, and is then used as a trigger signal for allowing the operation control unit 103 to apply a braking force to the driven roller 2. The sensor detecting the lateral displacement may be any of various sensors, for example, a contact sensor, an optical sensor, and a magnetic sensor.

Figure 11:
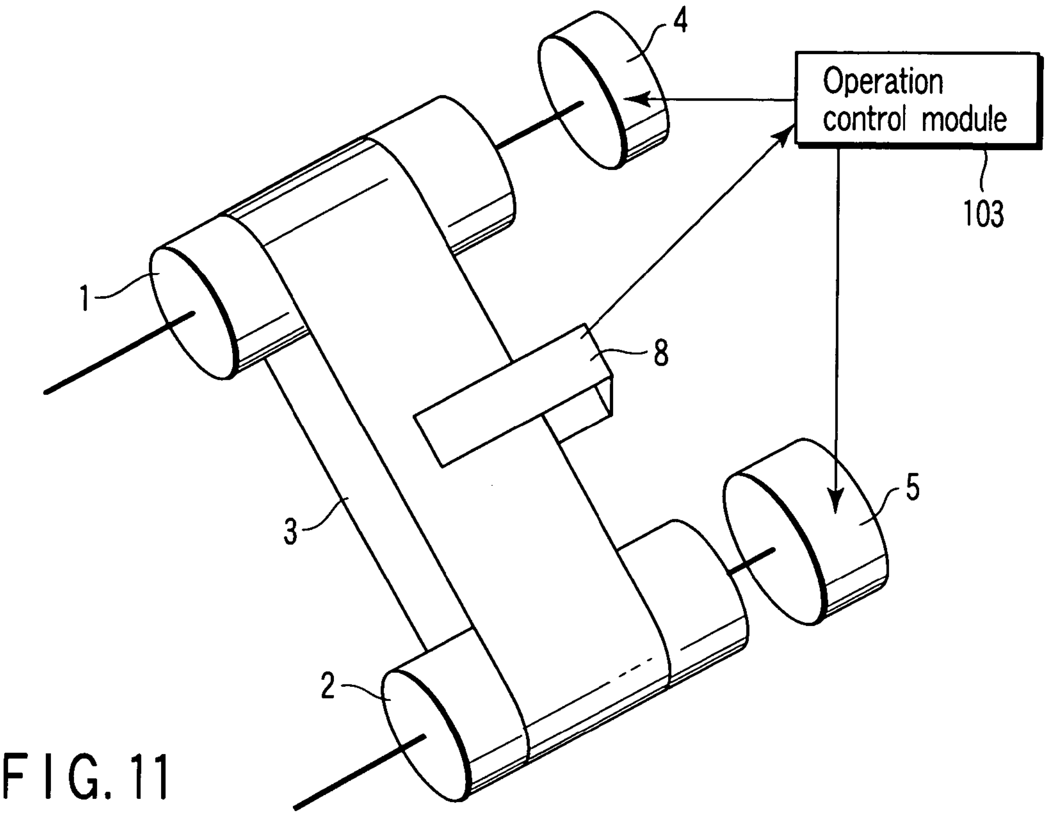
FIG. 11 is a perspective view showing a belt driving mechanism in accordance with a fourth embodiment of the present invention.

FIG. 11 shows a belt driving mechanism in accordance with a fourth embodiment. In the belt driving mechanism shown in FIG. 11, an optical position sensor 8 is provided on a side of the belt 3 of the belt driving mechanism shown in FIG. 4; the optical position sensor 8 can continuously measure the laterally displaced position of the belt 3 over the distance of lateral movement of the belt. The optical position sensor 8 has a measurement range including a belt lateral displacement margin range specific to the apparatus. If the lateral displacement is within the belt lateral displacement margin range, the optical position sensor 8 determines that the belt 3 has not been substantially displaced laterally, on the basis of an output signal from the optical position sensor 8. It is not until the output signal exceeds the margin range that the operation control unit 103 determines that the belt 3 has been displaced laterally. When the laterally displaced position of the belt exceeds a predetermined threshold, the position of the belt 3 is controllably corrected.

Figure 12:
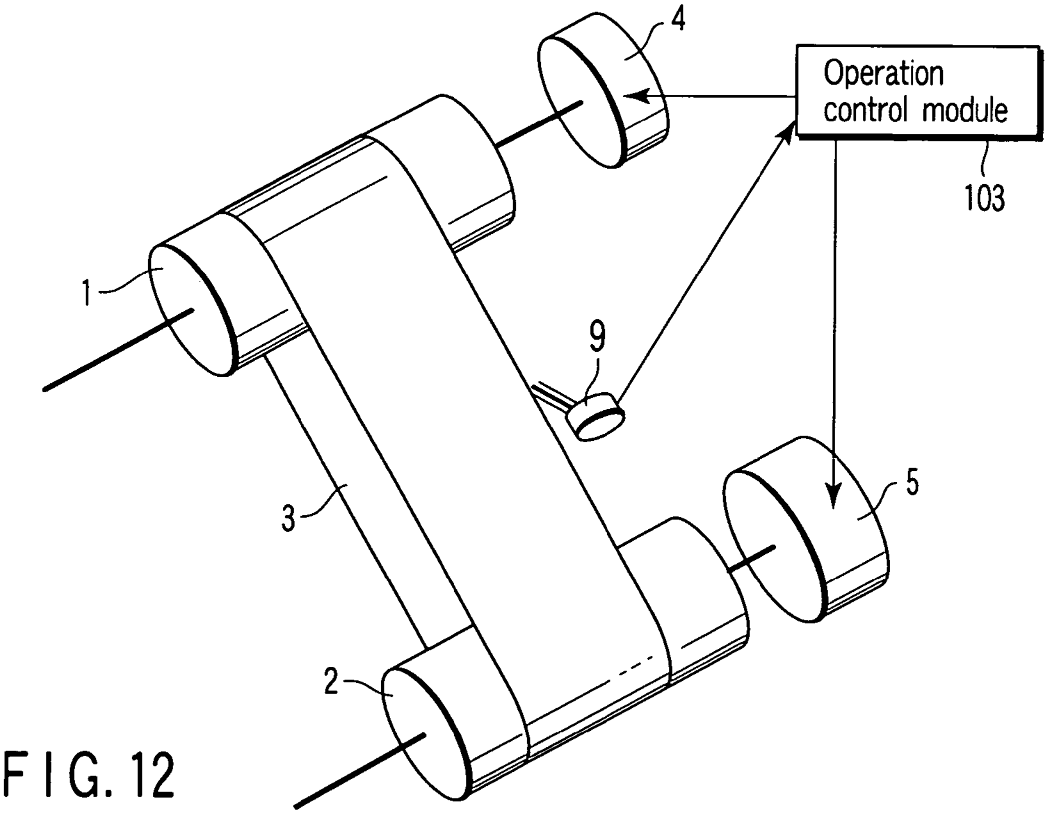
FIG. 12 is a perspective view showing a belt driving mechanism in accordance with a fifth embodiment of the present invention.

The area sensor is not limited to the optical position sensor 8 but may be another type of sensor. FIG. 12 shows a belt driving mechanism in accordance with a fifth embodiment which controls the belt position using a contact sensor 9 instead of the optical position sensor 8. The contact sensor 9, shown in FIG. 12, has a bar-like sensor tactile section that is always in contact with the end of the belt under a weak force. Accordingly, when the end surface of the belt is displaced and moved laterally, the bar-like sensor tactile part as the contact sensor 9 follows the movement of the belt. The contact sensor 9 can thus continuously sense the position of the belt. When the sensor senses that the displacement has exceeded the predetermined distance, the position of the belt 3 is controllably corrected on the basis of the sensing.

Figure 13:
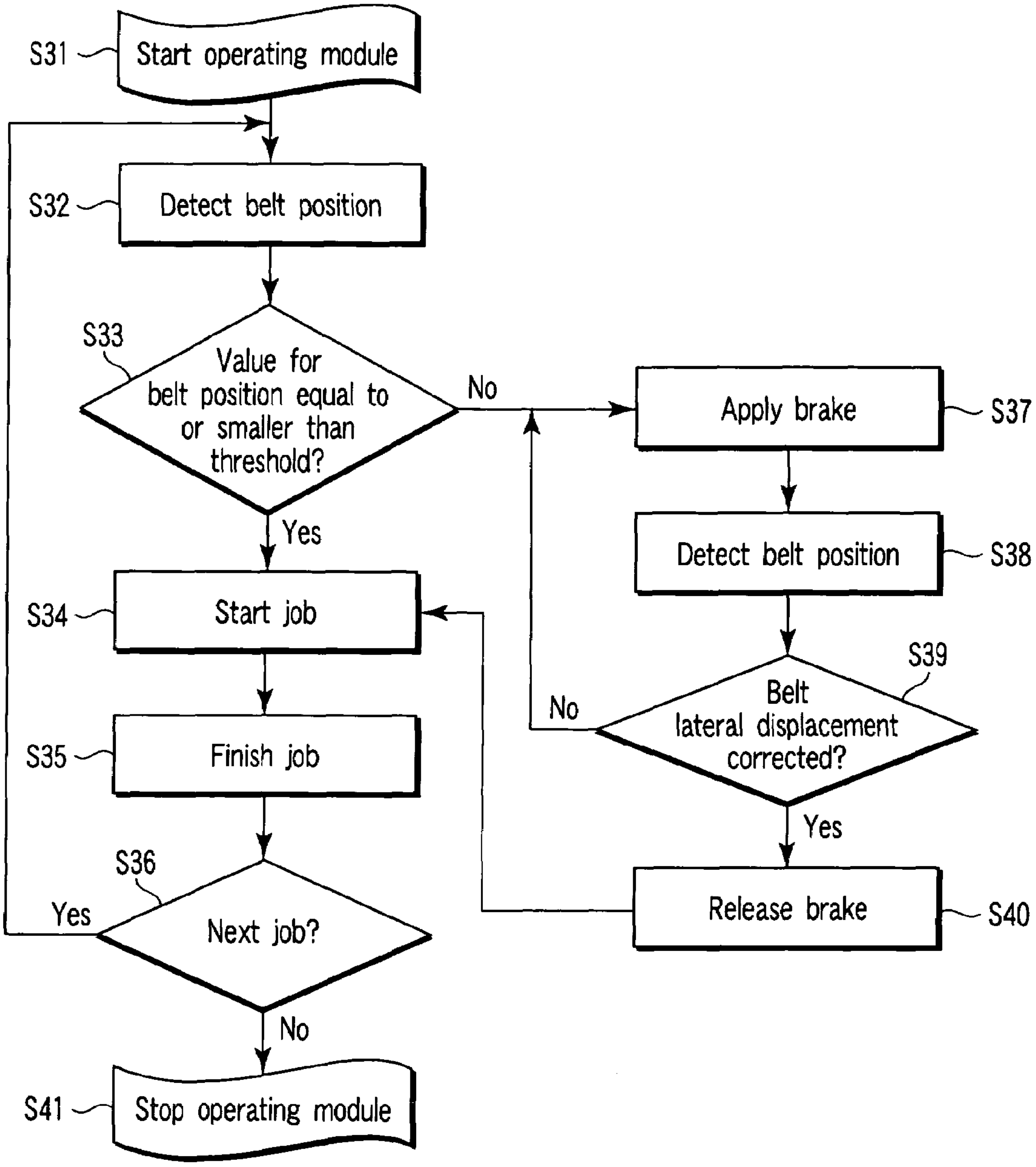
FIG. 13 is a flowchart showing a control method of correcting the belt position in the belt driving mechanisms shown in FIGS. 11 and 12.

FIG. 13 is a flowchart showing a control method of correcting the belt position in the belt driving mechanisms shown in FIGS. 11 and 12. As shown in step S31 in FIG. 13, the operation control unit 103 actuates the apparatus to start driving the driving roller 1. As shown in step S32, the operation control unit 103 senses the position of the endless belt 3 on the basis of the sensor signal. As shown in step S33, the operation control unit 103 determines whether or not the position of the endless belt 3 exceeds a preset threshold. The operation control unit 103 thus branches the process depending on the determination. As shown in step S34, if the belt position does not exceed the threshold, the operation control unit 103 starts the job. As shown in step S35, the operation control unit 103 subsequently finishes the job.

In step S33, if the position of the endless belt 3 exceeds the threshold, the process shown in steps S37 to S39 is executed. As shown in step S37, the operation control unit 103 exerts a braking force on the driven roller 2. As shown in step S38, the operation control unit 103 then senses the position of the endless belt 3 on the basis of the sensor signal. As shown in step S39, the operation control unit 103 determines whether or not the laterally displaced position of the endless belt 3 has been corrected. If the laterally displaced position has not been corrected, the process returns to step S37 to continuously apply the braking force. If the operation control unit 103 senses that the lateral displacement of the belt has been corrected, the process shifts to step S40. The driven roller 2 then starts to rotate with the brake 5 released and thus no braking force applied to the driven roller 2.

To precisely determine that the belt position has been corrected, the above method continuously senses and corrects the position of the belt 3 while exerting a braking force on the driven roller 2, in steps S37 to S39.

When the process shifts to step S40, the operation control unit 103 stops exerting a braking force on the driven roller 2. Subsequently, the operation control unit 103 starts the job as shown in step S34 and finishes it as shown in step S35. Once the job is finished, the operation control unit 103 determines whether or not there is a next job as shown in step S36. If there is a next job, the process returns to step S32. If there is no further job, the operation control unit 103 stops operating the apparatus as shown in step S41.

The belt position can be controlled regardless of whether no senor is provided which can sense the belt position across the width of the belt or sensors are installed at two particular points so as to be able to sense the presence of the belt.

Figure 14:
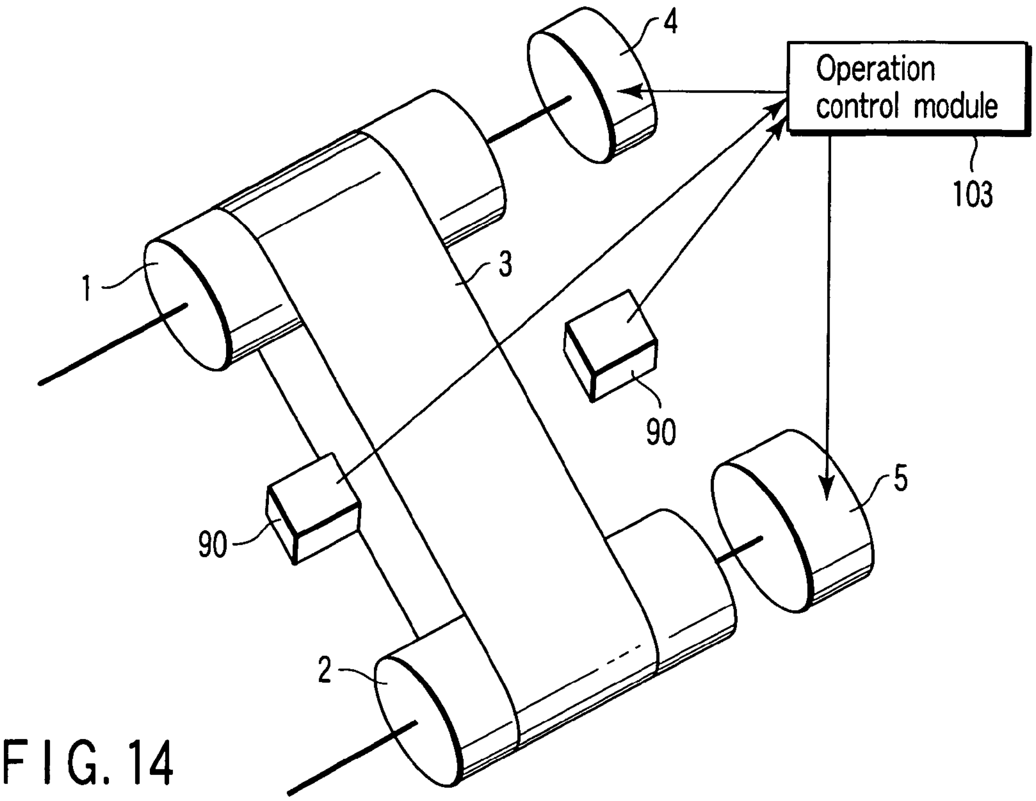
FIG. 14 is a perspective view showing a belt driving mechanism in accordance with a sixth embodiment of the present invention.
Figure 15:
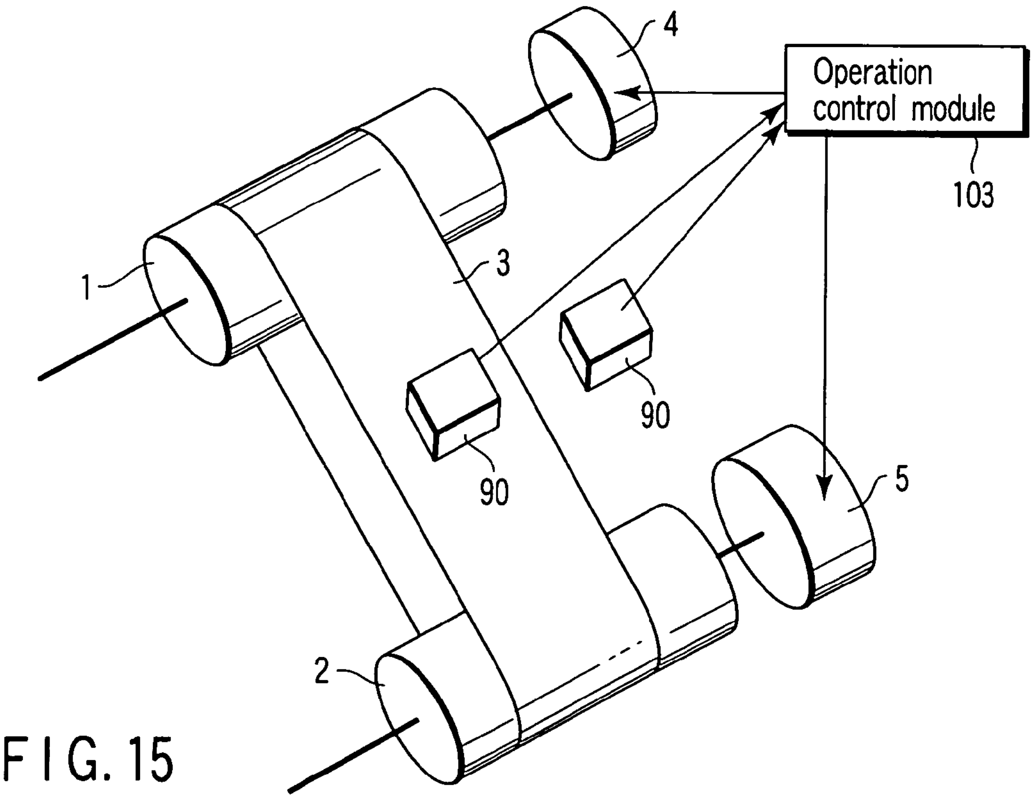
FIG. 15 is a perspective view showing a belt driving mechanism in accordance with a seventh embodiment of the present invention.

FIGS. 14 and 15 show belt driving mechanisms in accordance with a sixth and seventh embodiments of the present invention. In the belt driving mechanisms shown in FIGS. 14 and 15, a plurality of position sensors 90 are arranged to detect the belt position. The plurality of position sensors 90 ensure that simple control enables the belt to run within specified positions. The position sensor 90 may be any of various sensors including a contact sensor, an optical sensor, and a magnetic sensor. The belt driving mechanism shown in FIG. 14 uses optical sensors 90.

In the sensor arrangement shown in FIG. 14, paired optical sensors 90 are arranged opposite the respective lateral end surfaces of the endless belt 3. When the lateral displacement exceeds the threshold, the laterally arranged paired optical sensors 90 detect the displacement. In the sensor arrangement shown in FIG. 15, the paired optical sensors 90 are arranged at one end of the endless belt 3 at positions where they can detect the lateral displacement threshold. With the sensor arrangements shown in FIGS. 14 and 15, when displaced a distance exceeding the threshold, the belt crosses either of the sensors, which has its output changed. This makes it possible to sense that the lateral displacement of the belt has exceeded the threshold.

Figure 16:
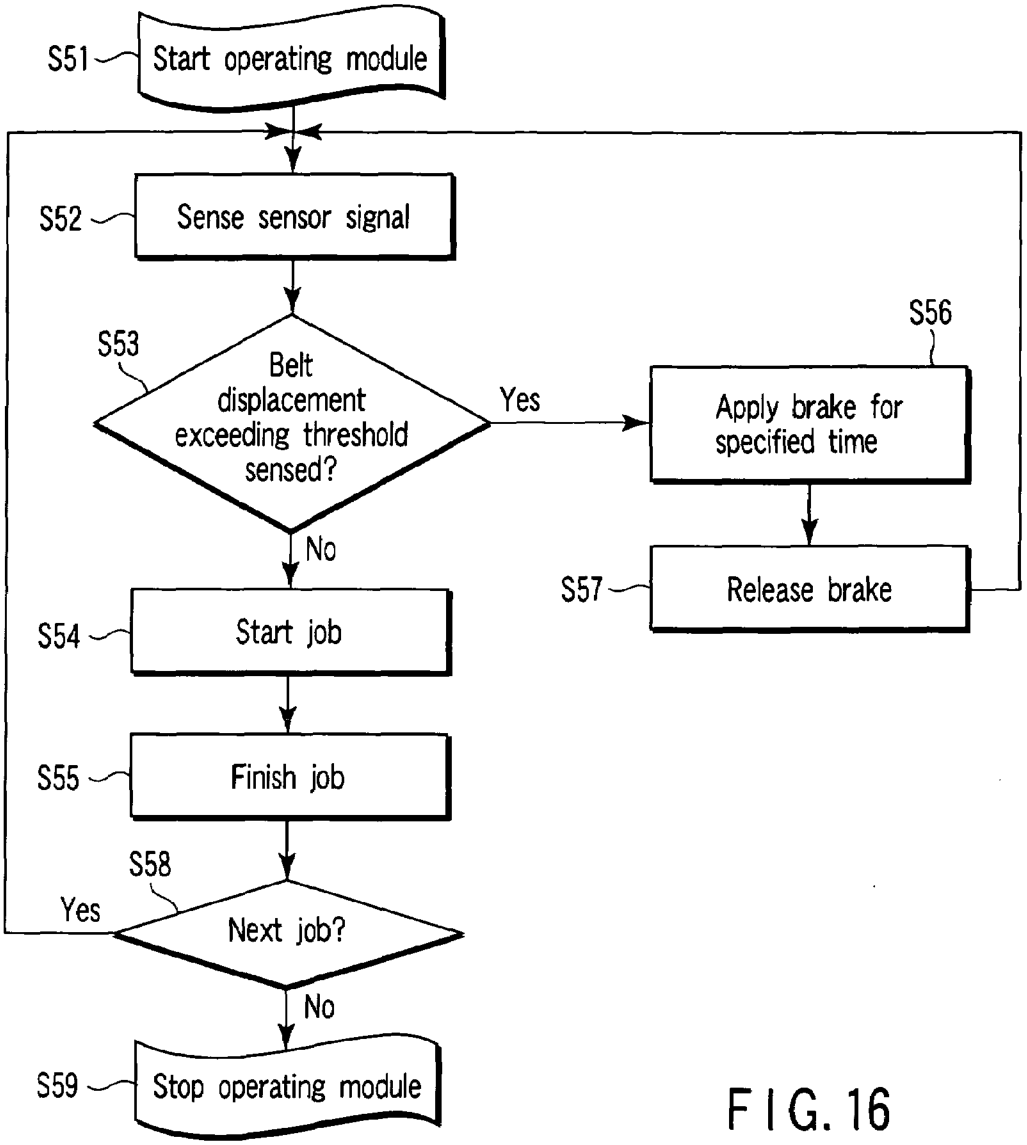
FIG. 16 is a flowchart showing a control method of correcting the belt position using sensor arrangements shown in FIGS. 14 and 15.

FIG. 16 is a flowchart showing a control method of correcting the belt position using the sensor arrangements shown in FIGS. 14 and 15. As shown in step S51 in FIG. 16, the operation control unit 103 actuates the apparatus and thus the driving roller. As shown in step S52, the operation control unit 103 senses a sensor signal from the sensor 90. As shown in step S53, the operation control unit 103 determines from the sensor signal whether the belt has been displaced laterally a distance exceeding the threshold. The operation control unit 103 branches the process to step S56 or S54 depending on the determination.

If the lateral displacement exceeds the threshold in step S53, the process shifts to step S56. The operation control unit 103 applies a braking force to the driven roller for a preset time to correct the belt position as shown in step S56. As shown in step S57, the operation control unit 103 subsequently stops applying the braking force. The process returns to step S52.

If the operation control unit 103 does not sense any lateral displacement in step S53, it starts the job as shown in step S54. As shown in step S55, the operation control unit 103 subsequently finishes the job. As shown in step S58, the operation control unit 103 determines whether or not there is a next job. The operation control unit 103 then branches the process to step S52 or S59 depending on the determination. If there is a next job, the process returns to step S52. If there is no further job, the operation control unit 103 stops operating the apparatus as shown in step S59.

In the above control, the belt position has only to be sensed for only a part of the belt 3. The above control is thus applicable if it is difficult to measure the belt position over the entire range within which the belt is expected to have moved. The time during which the brake is operated may be preset by, for example, measuring the time required to correct the belt position.

The speed at which to correct the lateral displacement of the belt generally varies depending on the magnitude of the braking force applied to the driven roller. The belt can thus be held at a specified target running position by continuously controlling the magnitude of the braking force.

Figure 17:
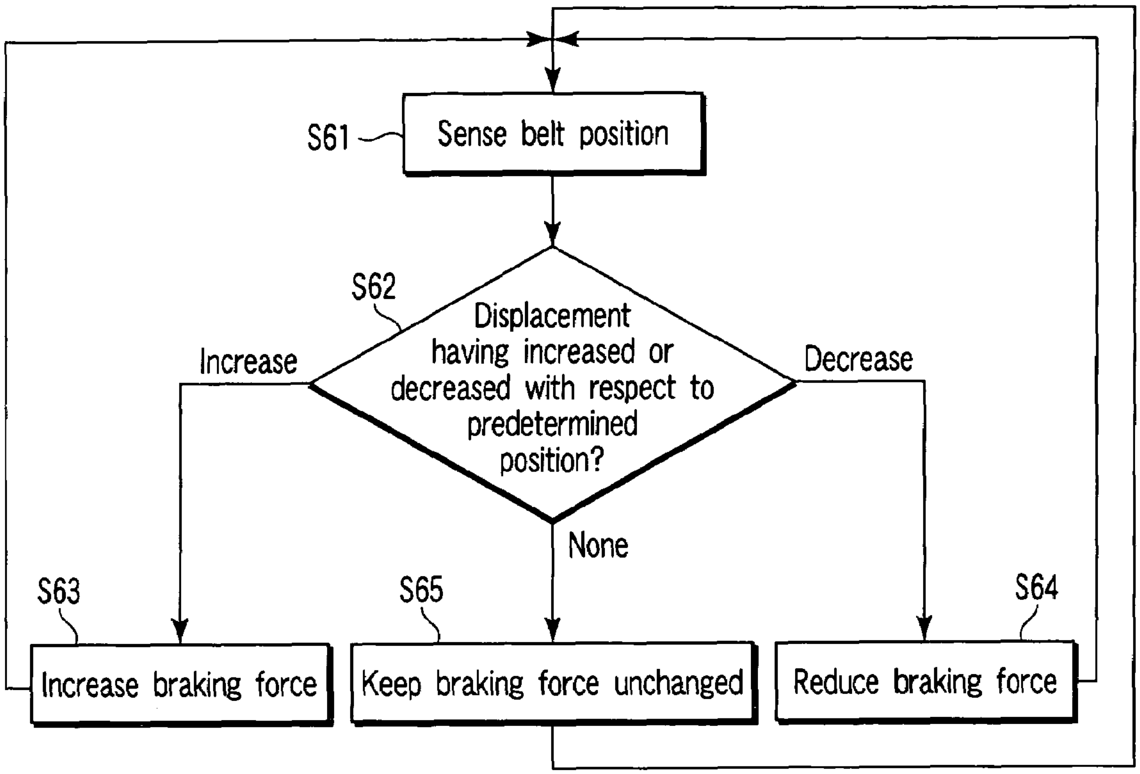
FIG. 17 is a flowchart showing a method of controlling a braking force by feeding back the result of sensing of the belt position in the belt driving mechanisms shown in FIGS. 9, 11, and 12.

FIG. 17 is a flowchart showing a method of controlling a braking force by feeding back the result of sensing of the belt position. The method of controlling a braking force will be described with reference to the flowchart in FIG. 17.

As shown in step S61, the operation control unit 103 senses the amount of displacement of the belt while the belt 3 is running. As shown in step S62, the operation control unit 103 determines whether the amount of lateral displacement has increased or decreased with respect to a predetermined position on the basis of the measured amount of displacement of the belt and a temporal variation in the amount. If the amount of lateral displacement has increased with respect to the target belt position, the process shifts to step S63. If the operation control unit 103 determines that the amount of lateral displacement has not changed, the process shifts to step S65. If the operation control unit 103 determines that the amount of lateral displacement has decreased to move the belt 3 closer to the predetermined position, the process shifts to step S64.

In step S63, the operation control unit 103 increases the braking force to rapidly return the belt to within the predetermined tolerable range of lateral displacement. In step S64, the operation control unit 103 reduces the braking force to slowly return the belt to within the predetermined tolerable range of lateral displacement, thus making the brake ready to be released. In step S65, the operation control unit 103 determines that the belt 3 has been returned to within the predetermined tolerable range of lateral displacement. The operation control unit 103 thus does not change the braking force. After the braking force is controlled in steps S63, S64, and S65, the control returns to step S61 to repeat controlling the braking force. The gain of the braking force control has a value specific to the apparatus.

Figure 18:
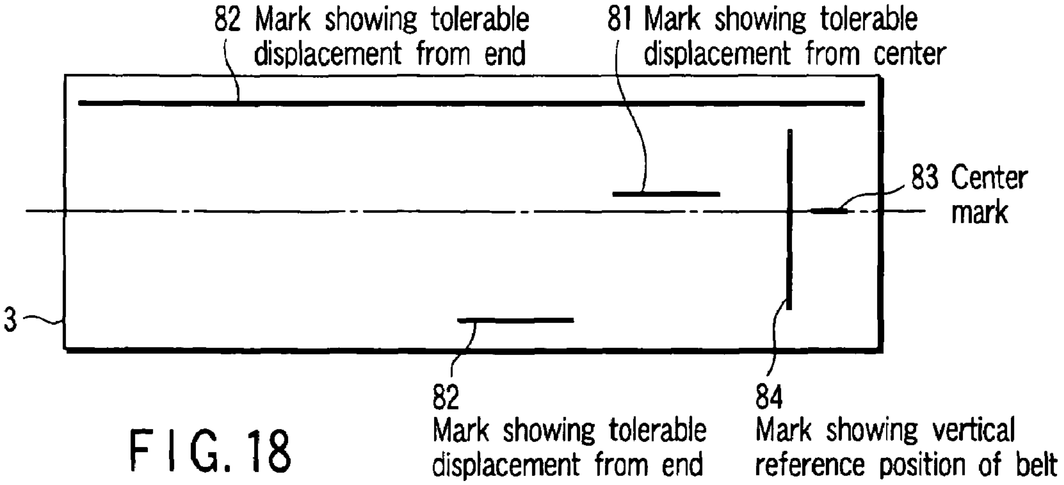
FIG. 18 is a plan view showing an example of marks drawn on the belts shown in FIGS. 9, 11, 12, 14, and 15, to allow the belt position to be detected.
Figure 19:
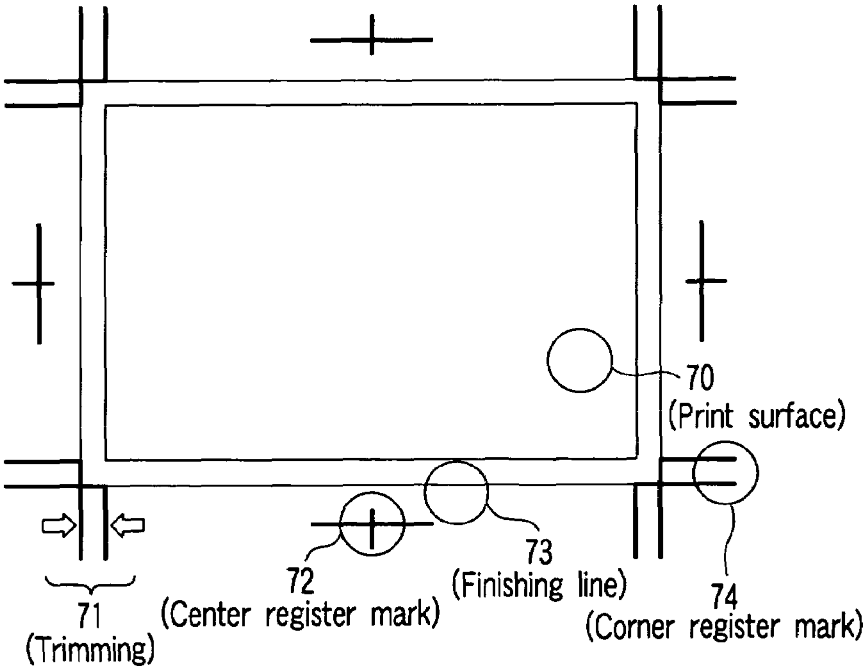
FIG. 19 is a plan view schematically showing, for reference, register marks commonly used to register print paper or the like in the field of printing.

The above flat belt 3 may have special marks that help the sensor sense the running distance or a positional deviation. FIG. 18 shows an example in which linear marks similar to lines called register marks are drawn on the belt 3. The register marks are commonly used to register print paper or the like in the field of printing as shown in FIG. 19. Examples of the register marks include a trimming register mark 71, a center register mark 72, finish line register mark 73, and a corner register mark 74 which are provided around the periphery of surface of a copy 70.

The running distance or positional deviation can be measured by drawing, on the belt 3, marks which are similar to register marks and which can be sensed by optical sensors as shown in FIG. 18. Several methods can be used to draw marks similar to register marks. FIG. 18 shows a mark 81 showing a tolerable displacement from the center of the belt 3, a mark 82 showing a tolerable displacement from an end of the belt 3, a mark 83 corresponding to a center register mark and showing the center of the belt 3, and a mark 84 showing a vertical reference position of the belt 3. All or some of these marks are preferably drawn on the belt 3. The mark 81, showing the tolerable displacement from the center, is drawn parallel to the center line of the belt at a distance from the belt center line which is equivalent to a belt positional displacement threshold. The mark 82, showing the tolerable deviation from the end of the belt, is drawn parallel to the lateral end of the belt at a distance from the belt end which is equivalent to the belt positional displacement threshold. The mark 83, which is similar to a center register mark, is drawn on the center line of the belt. The mark 84, showing the vertical reference position of the belt 3, is drawn perpendicularly to the advancing direction of the belt. The lines of all the marks have arbitrary lengths and may be dashed or dotted. The marks 81, 82, 83, and 84 are optically detected and used as a reference for detection of the position of the belt 3.

As in the case of marks such as those shown in FIG. 18, the belt 3 may be magnetically printed, magnetic tapes may be applied to the belt 3, or magnetic dots may be embedded in the belt 3. These magnetic marks enable the magnetic sensor to detect the belt position.

Figure 20:
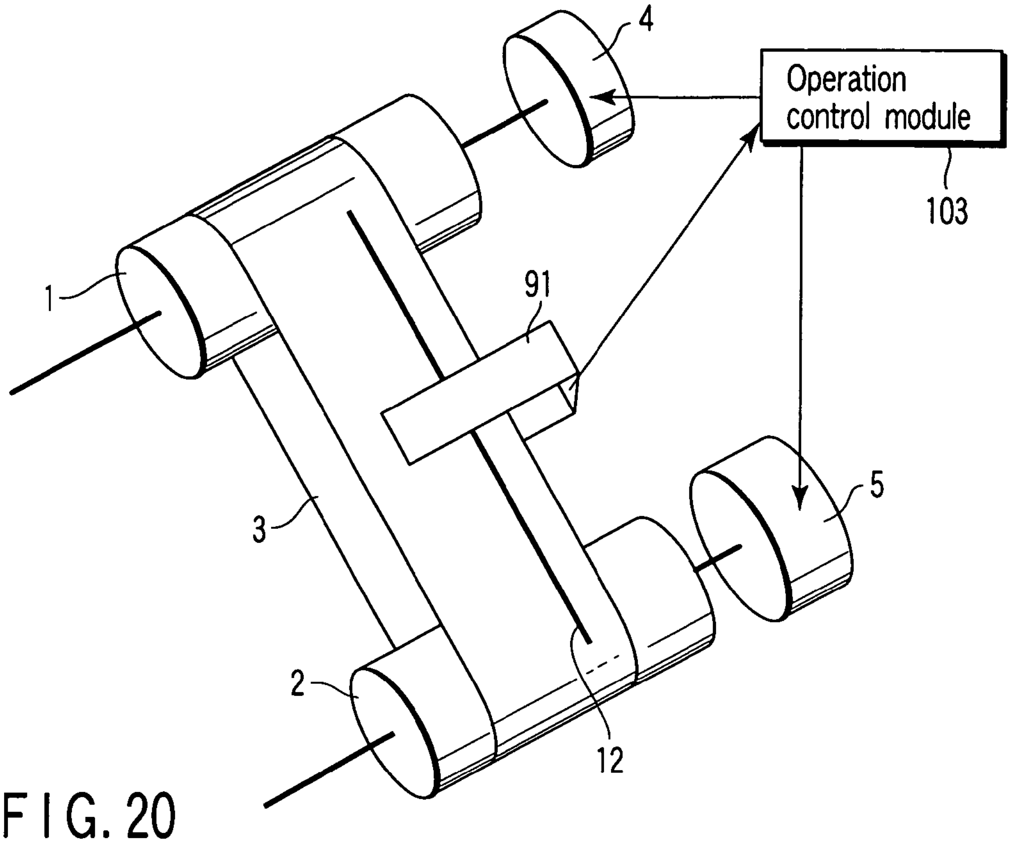
FIG. 20 is a perspective view schematically showing a belt driving mechanism in accordance with an eighth embodiment of the present invention.
Figure 21:
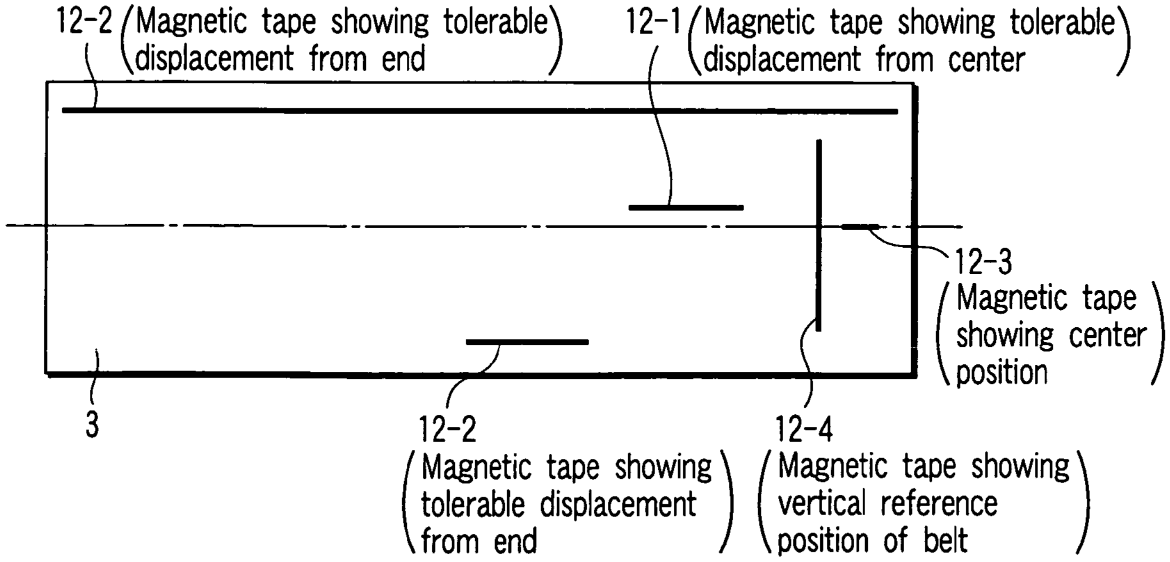
FIG. 21 is a plan view schematically showing an example of magnetic tapes applied to a belt shown in FIG. 20.

FIG. 20 shows a belt driving mechanism in accordance with an eighth embodiment of the present invention. In the belt driving mechanism shown in FIG. 20, a magnetic sensor 91 detects magnetic tapes 12 applied to the belt 3 as shown in FIG. 21, to detect the lateral position and running distance of the belt 3. The flowcharts shown in FIGS. 7, 10, 13, and 16 are appropriately applied to the control of position of the belt 3 depending on the type of signals detected by the magnetic sensor 91. FIG. 20 shows only one magnetic sensor 91. However, other magnetic sensors 91 are arranged at appropriate positions in association with the magnetic tapes 12 shown in FIG. 20. The magnetic tapes 12 are detected by the corresponding magnetic sensors 91.

FIG. 21 shows a magnetic tape 12-1 showing a tolerable displacement from the center of the belt 3, a magnetic tape 12-2 showing a tolerable displacement from an end of the belt 3, a magnetic tape 12-3 corresponding to a center register mark and showing the center of the belt 3, and a magnetic tape 12-4 showing a vertical reference position of the belt 3. All or some of these marks are preferably provided on the belt 3. The magnetic tape 12-1, showing the tolerable displacement from the center, is provided parallel to the center line of the belt at a distance from the belt center line which is equivalent to a belt positional displacement threshold. The magnetic tape 12-2, showing the tolerable deviation from the end of the belt, is provided parallel to the lateral end of the belt at a distance from the belt end which is equivalent to the belt positional displacement threshold. The magnetic tape 12-3, which is similar to a center register mark, is provided on the center line of the belt. The magnetic tape 12-4, showing the vertical reference position of the belt 3, is provided perpendicularly to the advancing direction of the belt. All the magnetic tapes have arbitrary lengths and may have dashed or dotted magnetic layers. The magnetic tapes 12-1, 12-2, 12-3, and 12-4 are magnetically detected and used as a reference for detection of the position of the belt 3.

As described above, the belt driving mechanism in accordance with the present invention is configured as described below.

(1) The belt driving mechanism comprises the brake that exerts a braking force on the driven roller to control the braking force.

(2) The positional relationship between the driving roller and the driven roller involves the angle of torsion extending outward from the plane composed of the points of opposite ends of the driving roller axis and the middle point between the opposite ends of the driven roller axis.

(3) The coefficients of friction and the contact angles between the rollers and belt are adjusted so that when a braking force is applied to the driven roller, the belt driving force resulting from the friction between the driving roller and the belt is larger than the resistance resulting from the friction between the driven roller and the belt.

Therefore, the belt driving mechanism in accordance with the present invention can correct and prevent the positional displacement of the flat belt. In a media conveying apparatus into which flat belt conveyor system in accordance with the belt driving mechanism of the present invention is incorporated, the positional displacement of the flat belt can be easily corrected and prevented. This makes it possible to simplify the device configuration and to achieve precise conveyance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A belt driving mechanism comprising:

a driving roller having first and second opposite ends, a first roller axis passing through the first and second opposite ends and a first middle point between the first and second opposite ends, the driving roller being rotated;

a driven roller having third and fourth opposite ends and a second roller axis passing through the third and fourth opposite ends and a second middle point between the third and fourth opposite ends, the second roller axis being placed at a certain angle of torsion to a plane containing the first and second opposite ends and the second middle point;

an endless belt wrapped around the driving roller and driven roller to run between the driving roller and the driven roller, the driven roller being rotated by the endless belt in accordance with the rotation of the driving roller;

a brake configured to apply a braking force to the driven roller to restrict the rotation of the driven roller while keeping the driving roller rotating to run the endless belt, so that the endless belt is slipped on the driven roller; and a control unit configured to control the braking force.

2. The belt driving mechanism according to claim 1, wherein a resistance resulting from friction between the endless belt and the driven roller under the control of the brake is set larger then a belt driving force resulting from friction between the driving roller and the belt.

3. The belt driving mechanism according to claim 2, wherein a resistance is determined depending on a coefficient of friction between the driven roller and the endless belt and a contact angle between the driven roller and the endless belt.

4. The belt driving mechanism according to claim 1, wherein a coefficient of friction between the driven roller and the endless belt is smaller than that between the driving roller and the endless belt.

5. The belt driving mechanism according to claim 1, wherein a contact angle between the driven roller and the endless belt is smaller than that between the driving roller and the endless belt.

6. The belt driving mechanism according to claim 1, wherein the control unit comprises:

a measuring unit configured to measure a running distance of the endless belt, and the control unit controls the brake so as to apply a braking force to the driven roller when the measured running distance exceeds a threshold distance.

7. The belt driving mechanism according to claim 6, wherein the threshold distance is predetermined on the basis of a relationship between the running distance and an amount of lateral displacement of the endless belt.

8. The belt driving mechanism according to claim 1, wherein the control unit controls the brake so as to apply a braking force to the driven roller when a running period of the endless belt exceeds a preset threshold period.

9. The belt driving mechanism according to claim 1, wherein the control unit controls the brake so as to apply a braking force to the driven roller when a running period of the driving roller exceeds a preset threshold period.

10. The belt driving mechanism according to claim 1, wherein the control unit comprises:

a sensor configured to sense a lateral position of the endless belt to generate a sensing signal, and the control unit control the brake to apply a braking force to the driven roller in accordance with the sensing signal from the sensor.

11. The belt driving mechanism according to claim 1, wherein the control unit comprises:

a sensor configured to sense lateral displacement of the endless belt which is equal to or larger than a threshold to generate a detection signal and the control unit controls the brake so as to apply a braking force to the driven roller in accordance with the detection signal.

12. The belt driving mechanism according to claim 1, wherein the control unit applies the braking force after a preset period has elapsed.

13. The belt driving mechanism according to claim 1, wherein the control unit controls the brake so as to apply the braking force which is continuously varied, to the driven roller.

14. The belt driving mechanism according to claim 1, wherein the endless belt is provided with magnetic prints, and the control unit comprises:

a sensor configured to sense the magnetic prints to detect a positional displacement of the endless belt.

15. The belt driving mechanism according to claim 1, wherein the endless belt is provided with marks, and the control unit comprises:

a sensor configured to sense the marks to detect a positional displacement of the endless belt.

16. The belt driving mechanism according to claim 1, wherein the control unit comprises:

a measuring part configured to measure one of a belt running distance, a roller rotation speed, and a belt lateral displacement to generate a measuring signal, and the control unit controls the brake to apply a braking force to the driven roller depending on the measuring signal.

17. The belt driving mechanism according to claim 1, wherein the control unit comprises:

a measuring unit including one of a contact sensor, an optical sensor, and a magnetic sensor.

18. The belt driving mechanism according to claim 1, wherein the brake corresponds to one of a drum type, electromagnetic type, and a disk type.

19. A method of controlling a position of an endless belt in a belt driving mechanism comprising:

a driving roller having first and second opposite ends, a first roller axis passing through the first and second opposite ends and a first middle point between the first and second opposite ends, the driving roller being rotated;

a driven roller having third and fourth opposite ends and a second roller axis passing through the third and fourth opposite ends and a second middle point between the third and fourth opposite ends, the second roller axis being placed at a certain angle of torsion to a plane containing the first and second opposite ends and the second middle point; and an endless belt wrapped around the driving roller and driven roller to run between the driving roller and the driven roller, the driven roller being rotated by the endless belt in accordance with the rotation of the driving roller;

the method comprising:

applying a braking force to the driven roller and adjusting the braking force to restrict the rotation of the driven roller while keeping the driving roller rotating to run the endless belt, so that the endless belt is slipped on the driven roller.

20. The method of controlling a position of an endless belt according to claim 19, wherein a resistance resulting from friction between the endless belt and the driven roller under the control of the brake is set smaller then a belt driving force resulting from friction between the driving roller and the belt.

21. The method of controlling a position of an endless belt according to claim 20, wherein a resistance is determined depending on a coefficient of friction between the driven roller and the endless belt and a contact angle between the driven roller and the endless belt.

22. The method of controlling a position of an endless belt according to claim 19, wherein a coefficient of friction between the driven roller and the endless belt is smaller than that between the driving roller and the endless belt.

23. The method of controlling a position of an endless belt according to claim 19, wherein a contact angle between the driven roller and the endless belt is smaller than that between the driving roller and the endless belt.

24. The method of controlling a position of an endless belt according to claim 19, further comprising:

measuring a running distance of the endless belt, and controlling the brake so as to apply a braking force to the driven roller when the measured running distance exceeds a threshold distance.

25. The method of controlling a position of an endless belt according to claim 24, wherein the threshold distance is predetermined on the basis of a relationship between the running distance and an amount of lateral displacement of the endless belt.

26. The method of controlling a position of an endless belt according to claim 19, further comprising:

controlling the brake so as to apply a braking force to the driven roller when a running period of the endless belt exceeds a preset threshold period.

27. The method of controlling a position of an endless belt according to claim 19, further comprising:

controlling the brake so as to apply a braking force to the driven roller when a running period of the driving roller exceeds a preset threshold period.

28. The method of controlling a position of an endless belt according to claim 19, further comprising:

sensing a lateral position of the endless belt to generate a sensing signal, and controlling the brake to apply a braking force to the driven roller in accordance with the sensing signal from the sensor.

29. The method of controlling a position of an endless belt according to claim 19, further comprising:

sensing lateral displacement of the endless belt which is equal to or larger than a threshold to generate a detection signal and controlling the brake so as to apply a braking force to the driven roller in accordance with the detection signal.

30. The method of controlling a position of an endless belt according to claim 19, wherein the braking force is applied to the driven roller after a preset period has elapsed.

31. The method of controlling a position of an endless belt according to claim 19, wherein the braking force is continuously varied.

32. The method of controlling a position of an endless belt according to claim 19, wherein the endless belt is provided with magnetic prints, and the method further comprises:

sensing the magnetic prints to detect a positional displacement of the endless belt.

33. The method of controlling a position of an endless belt according to claim 19, wherein the endless belt is provided with marks, and the method further comprises:

sensing the marks to detect a positional displacement of the endless belt.

34. The method of controlling a position of an endless belt according to claim 19, further comprising:

measuring one of a belt running distance, a roller rotation speed, and a belt lateral displacement to generate a measuring signal, and controlling the brake to apply a braking force to the driven roller depending on the measuring signal.

* * * * *